J. H. ALANDAR, DEC'D.
R. McGREGOR, ADMINISTRATOR DE BONIS NON.
RAILWAY SIGNAL APPARATUS.
APPLICATION FILED MAR. 7, 1910.
1,177,081. Patented Mar. 28, 1916.
3 SHEETS—SHEET 3.
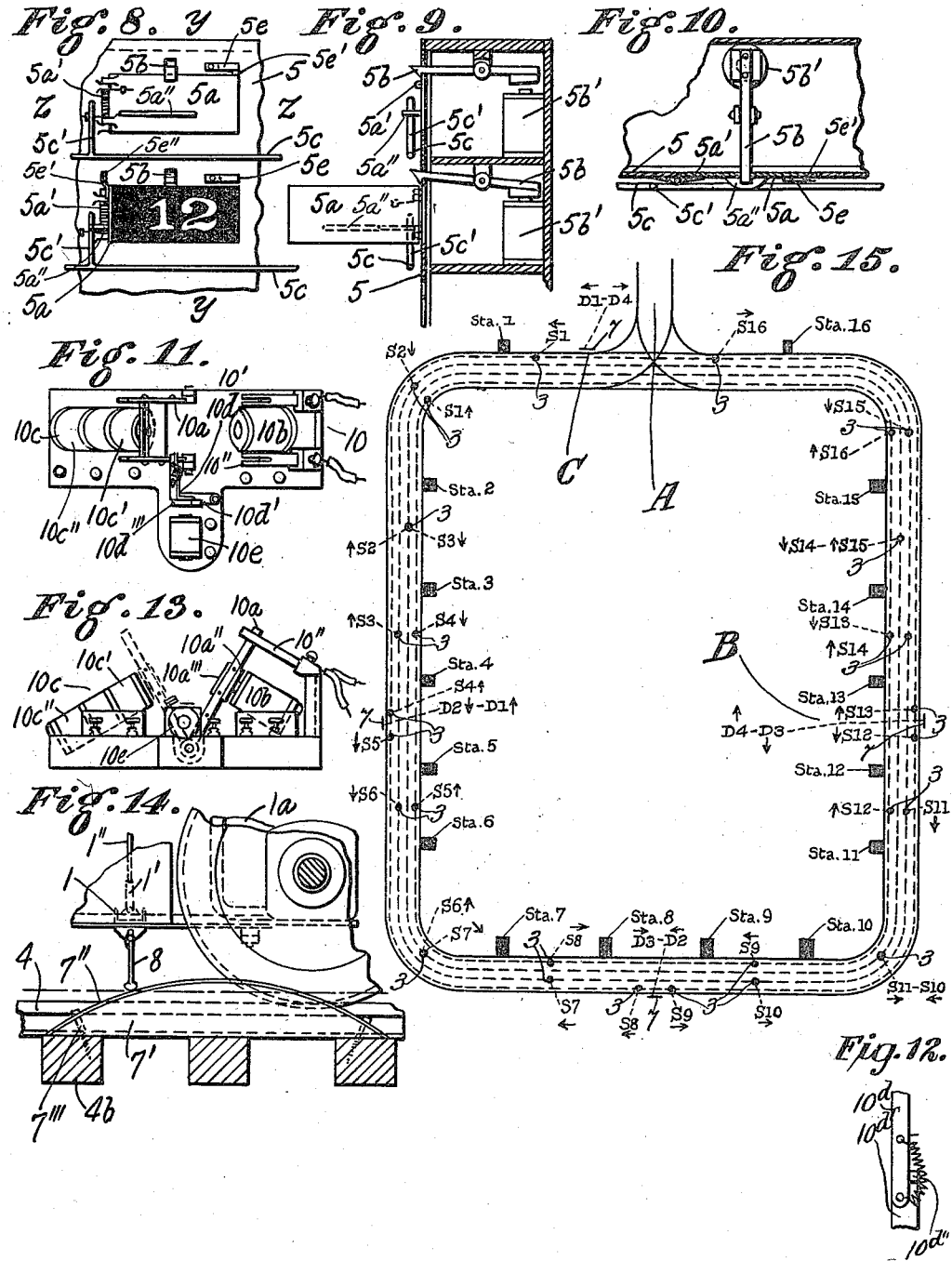
WITNESSES:
INVENTOR.
Joseph H. Alandar
BY Joseph T. Harrison
ATTORNEY.

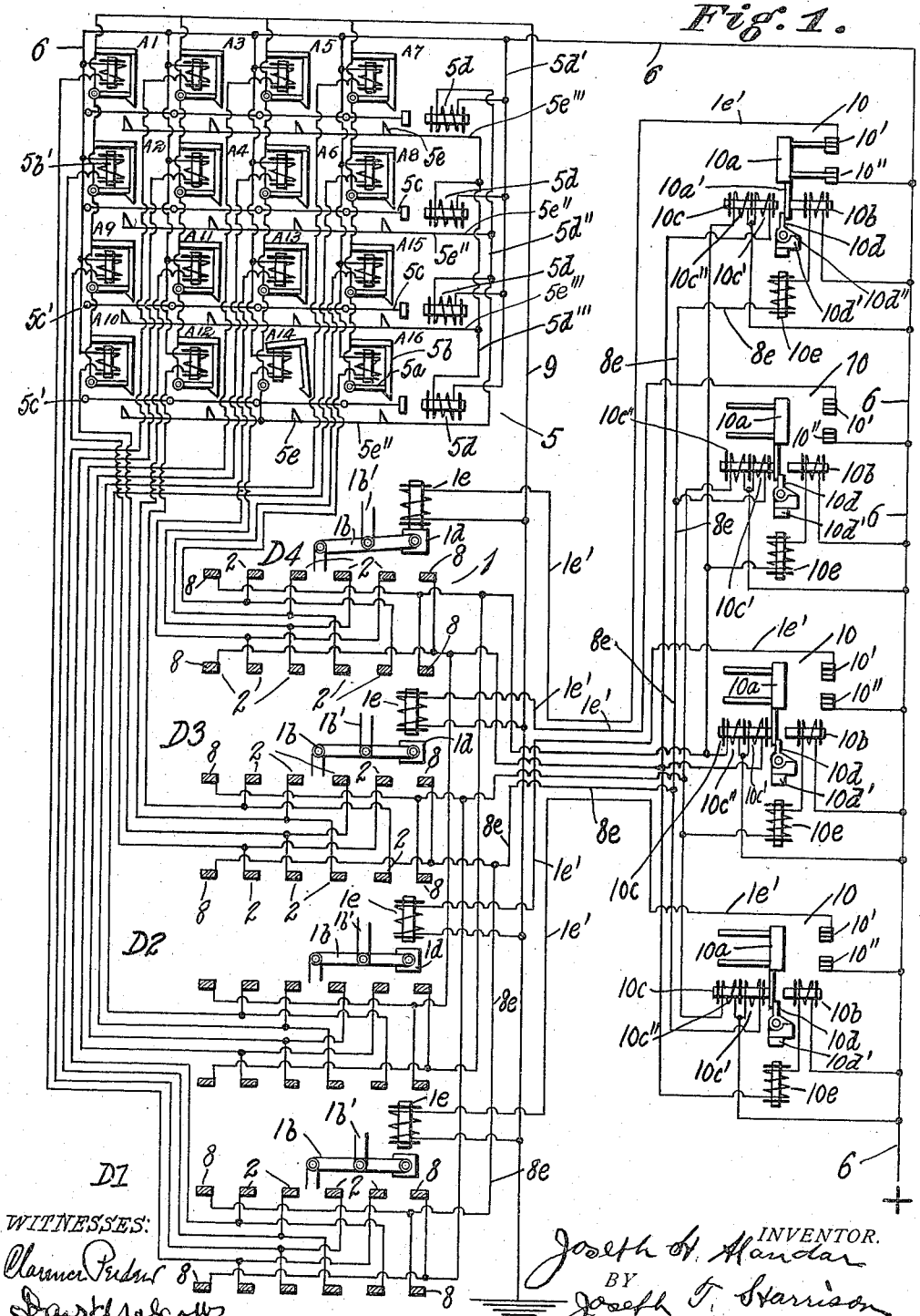

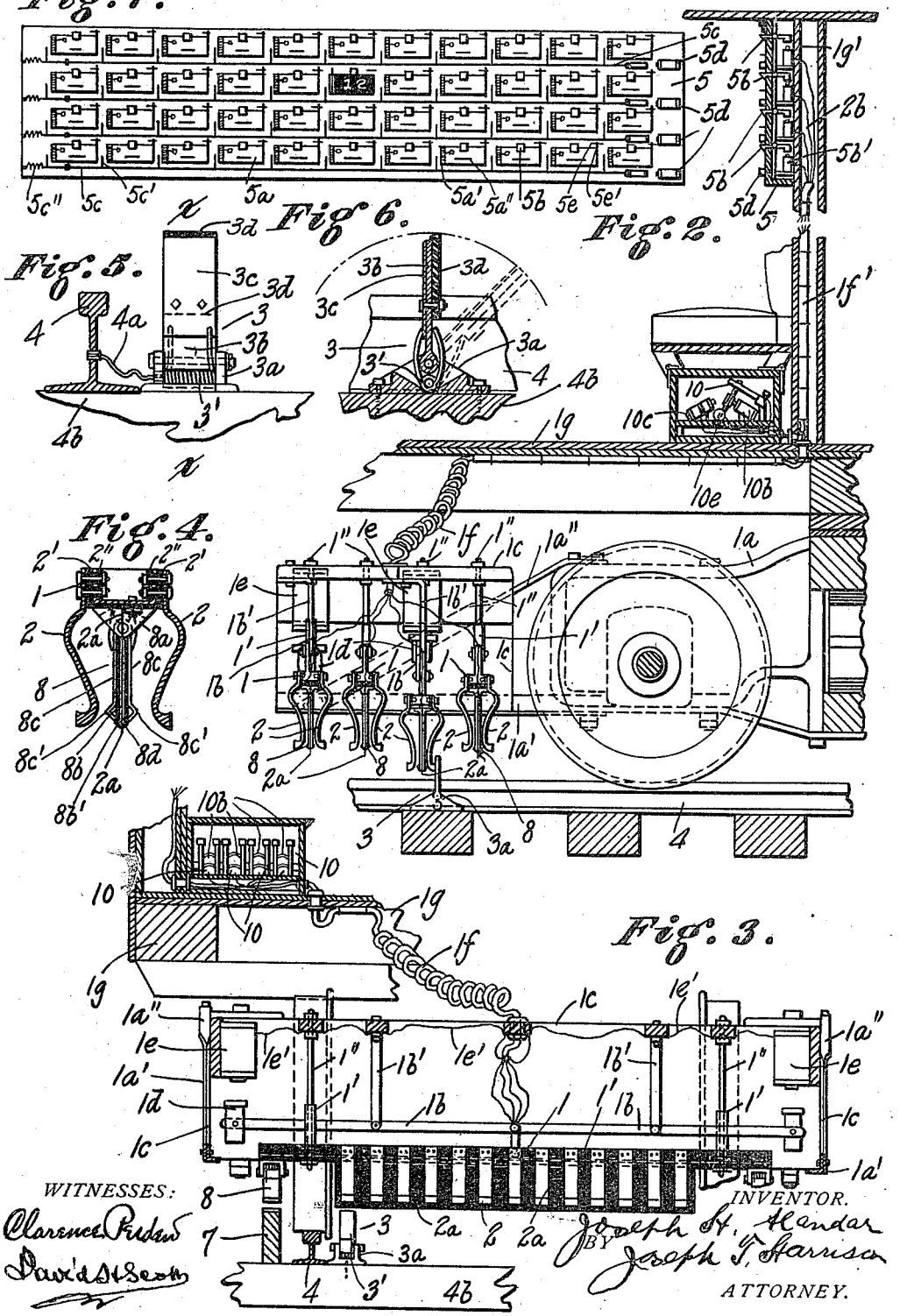

UNITED STATES PATENT OFFICE.

JOSEPH H. ALANDAR, OF CHICAGO, ILLINOIS; RAYMOND McGREGOR ADMINISTRATOR DE BONIS NON OF SAID ALANDAR, DECEASED.

RAILWAY SIGNAL APPARATUS.

1,177,081.  Specification of Letters Patent. Patented Mar. 28, 1916.

Application filed March 7, 1910. Serial No. 547,774.

*To all whom it may concern:*

Be it known that I, JOSEPH H. ALANDAR, a citizen of the United States, residing at Chicago, in the county of Cook and State of Illinois, have invented certain new and useful Improvements in Railway Signal Apparatus, of which the following is a specification.

My invention relates to railway signal apparatus and its object is to provide a means for indicating the approach to stations of a train or car on a railway.

My invention consists in the parts and in the details of construction and arrangement of parts, as will hereinafter be more fully described and claimed.

In the drawings: Figure 1 is a diagram of a system and the wiring connections thereof. Fig. 2 is a partial longitudinal section of a car and part of the track, showing the arrangement of the details according to the system indicated in Fig. 1. Fig. 3 is a partial cross section of the car and part of the track further illustrating the apparatus illustrated in Fig. 2. Fig. 4 is a vertical section of the contact board and two of the contact members thereon. Fig. 5 is a front elevation of one of the track contact members and its connection to the rail of the track. Fig. 6 is a vertical section on the line $x$—$x$ in Fig. 5. Fig. 7 is a front elevation of the indicating apparatus. Fig. 8 is an enlarged detail view of part of the indicating apparatus. Fig. 9 is a vertical section on the line $y$—$y$ of Fig. 8. Fig. 10 is a cross section on the line $z$—$z$ of Fig. 8. Fig. 11 is a plan view of the control board switch. Fig. 12 is a detail of the yieldable stop pin of the control board switch. Fig. 13 is a side elevation of said switch, one position of the switch bar being indicated by dotted line. Fig. 14 is a partial longitudinal section of a car truck and part of a track, illustrating the contact member on the track and the contact member on the truck for effecting the change of connections as the vehicle runs from one series of track contact members to the next. Fig. 15 is a diagram of a track system with the location of the stations and the corresponding track contact members thereof, the dotted lines indicating the alinement of the various contact members throughout the length of the track.

The installation of my improved signal apparatus in its preferred construction involves the use of the contact board 1 mounted on the truck 1ª of the car and provided with contact members 2 of resilient conducting material rigidly attached to the contact board 1 and insulated therefrom by means of slabs of insulating material 2' and 2''. Along the track, on the cross ties thereof, are contact members 3 mounted by means of spring hinges 3' in brackets 3ª so as to yield in either direction longitudinally of the track when engaged by the contact members 2 on the vehicle. Each contact member 3 preferably consists of a middle rib 3ᵇ of metal to give it strength, and a contact plate 3ᶜ on one side thereof, preferably of brass, and an insulating block 3ᵈ on the other side thereof and preferably extending up past the end of both the middle rib 3ᵇ and of the contact plate 3ᶜ. This block may be of fiber. The contact plate 3ᶜ is in electrical connection with the bracket 3ª through the hinged connection therewith, and the bracket 3ª is connected to the track rail 4 by a connection 4ª. The wheel of the vehicle is, of course, also in electrical connection with the rail 4, and it will be seen that any electrical conducting system on the vehicle that is connected to one of the contact members 2 thereon and connected to conducting parts of the vehicle will form part of the complete electrical circuit. With these details provided it is only necessary to arrange the contact members 2 in a series across the vehicle along the contact board 1, as best shown in Fig. 3 of the drawings, and arrange the contact members 3 on the track in corresponding positions transversely of the track, so that different contact members 2 will make contact with the different contact members 3 and thus provide selective connections which may be utilized in forming different circuits through the different contact members 2 on the vehicle.

The contact members 2 on one side of the contact board 1 are for making electrical connection when the vehicle is traveling in one direction, and those on the other side are to make such connection when the vehicle is traveling in the opposite direction, and an apron 2ª is secured to the contact board 1 along its middle and hangs down between the contact members 2 on the two sides. It is to coöperate with this arrangement that the track contact members 3 are so constructed as to make electrical conducting contact on one side and insulating contact on the other side as engaged by the contact members on the vehicle, and it will be seen that the insulating apron 2ª not only prevents contact between adjacent contact members 2 on the two sides of the contact board 1 but prevents contact of members 2 on one side with track contact members 3 that should make contact only with members 2 on the other side. Furthermore, each station the approach of the vehicle to which is to be signaled is provided with two of the track contact members 3, each having its electrical connecting side away from the station and being spaced the distance away from the station that it is required to have the signal of the approach to such station disclosed. Then when the vehicle approaches the station the forwardly presented contact member 2 on the contact board 1 will make electrical connection with the track contact member 3, but when leaving a station the contact member 2 will engage with the insulating side of said contact member 3 and no electrical connection will be made. This arrangement may be clearly understood upon inspection of Fig. 15 of the drawings where the different stations are designated as "Sta. 1", etc., and the track contact members corresponding to the various stations are indicated as "S. 1", etc., the direction of travel of the vehicle in which the respective contact members will make electrical contact with the contact members on the vehicle being indicated by small arrows accompanying the designations of the track contact members on the diagram. It will be noted that the track represented in this diagram as supplied with contact members according to my system is endless. However, it will be understood that with the track contact members arranged as shown the vehicle may be turned around on the track and the order of contact of the contact members on the vehicle with those on the track will be maintained. Thus, the car may run on to the Y at A in Fig. 15 or may be turned as on a loop at the end of a line and the order of operation of the station signals will not be changed.

When a large number of stations are to be indicated it becomes necessary to provide for different connections in number equal to the number of different stations to be indicated, and this number may be more than the space available between the rails of a track will permit while securing the proper spacing between the contact members as they must be mounted on the vehicle to make the selective engagements. As illustrated, the number of connections required is provided by using a plurality of contact boards 1.

In Fig. 3 the contact board 1 is illustrated as provided with thirteen contact members 2 on a single side of a contact board. This would allow the indication of thirteen stations while the vehicle is traveling in one direction and the equal number which would be provided on the other side of the board would allow the indication of the same thirteen stations while the vehicle is traveling in the other direction.

However, in the diagram in Fig. 1 as well as in the track diagram in Fig. 15 a single contact board is provided with only four contact members 2 on each side, this being for the purpose of simplifying the illustration.

The apparatus for indicating the stations comprises an annunciator 5 having shutters 5ª with springs 5ª′ to open them and held shut by hooks 5ᵇ which may be released from the shutters under the action of electro-magnets 5ᵇ′. Sixteen of such shutters are provided as indicated in Fig. 1, and to correspond therewith four contact boards 1 are provided each having four contact members 2 on each side making a total of sixteen contact members. Each contact board 1 is hung on a lever 1ᵇ and the levers are fulcrumed on hangers 1ᵇ′ inside a suitable case 1ᶜ that is mounted on the truck 1ª by means of a beam 1ª′ having a brace 1ª″. The lever 1ᵇ extending past the hanger 1ᵇ′ has a weight 1ᵈ on the other end heavy enough to act as a counterweight to the contact board 1 with its contact members 2 and hold said contact board up so that the contact members 2 cannot engage with the contact members 3 as the vehicle runs along the track. To bring the contact board into position so that the contact members 2 may engage with the members 3 an electro-magnet 1ᵉ is mounted in the case 1ᶜ so that it may attract the weight 1ᵈ upward allowing the opposite end of the lever 1ᵇ to go down with the contact board 1. The contact board 1 is guided at each end by sleeves 1′ sliding on vertical rods 1″ which are attached to the case 1ᶜ. As shown, two of the contact boards 1 have their levers extending toward one side of the vehicle and the other two extend toward the other side so that the arrangement of the parts is better facilitated.

The conductors 2ᵇ from the contact members 2 to the corresponding electro-magnets 5ᵇ′ in the indicating apparatus are carried through a flexible conduit 1ᶠ from the truck 1ª up to the car body 1ᵍ. The indicating apparatus or annunciator 5 is mounted on the wall 1ᵍ′ of the car body in a position convenient for observation, preferably over the entrance to the car, and the conductors $2^b$ are carried up to it through a conduit $1''$. Each conductor $2^b$ is simply connected to one end of the coil of its corresponding electro-magnet $5^{b'}$ and the other end of each of said coils is connected to a lead 6 by which means a suitable current may be supplied for energizing the coils $5^{b'}$, this source of current simply being indicated by the positive sign in the diagram. It will be understood that the source of current may be primary or secondary cells carried on the vehicle, or where electric lighting is provided on the vehicle, part of the current of this system may be shunted into the lead 6, or, if the vehicle be provided with electric motive power, part of the current thus provided may be used in the same manner.

In all cases the source of current being located on the vehicle, inconveniences incident to providing current along the tracks for any signal system is avoided, and the current supplying apparatus may always be kept in perfect condition due to the more constant attention received from the operatives of the railway.

By again referring to Fig. 15 it will be noted that the sixteen stations indicated in the diagram are arranged in four groups or divisions of four stations each to correspond to the four contact boards, each having four contact members on each side as indicated in Fig. 1. Thus arranged only four different locations transversely of the track are required for all of the contact members along the track and for those on the vehicle. With this understood it will be seen that when the thirteen contact members are permitted to be arranged transversely of the vehicle as in Fig. 3, a total of fifty-two stations may be indicated with four different contact boards 1 and by dividing the fifty-two stations into four groups of thirteen stations each. This division of the stations into groups and the bringing of the corresponding contact boards 1 into operative position as each group is reached is effected by providing the divisional controlling contact members 7 about mid-way between the last station of one group and the first station of the next. Such a contact member 7 on the track will serve to introduce the car into either division as the car travels in one direction or the other, and in Fig. 15 these members are designated as "$D^1$—$D^4$," etc., and the direction in which the car is traveling to be introduced into one division or the other is indicated by small arrows adjacent to the designations. To engage with this contact member 7 on the track a controlling contact member 8 is mounted on each contact board 1. Preferably the divisional contact member 7 is mounted outside the rail of the track and the member 8 may be mounted near the end of the contact board 1 where it extends out over the rail. Like the other contact members 2 on this board the contact member 8 may not engage with its corresponding member 7 unless the board 1 is lowered under the action of the magnet $1^e$. To provide for this engagement when the car is turned around on the track another member 8 is provided near the other end of the contact board 1 at the other side of the vehicle, only part of this member being shown in Fig. 3. Unlike the members 2 and members 3 electrical contact may take place between the members 8 and the members 7 when the vehicle approaches in either direction and in accordance with this requirement I prefer to construct the contact member 7 in the form of a segment, its upper surface sloping from its middle to its ends, and to construct the contact member 8 on the vehicle so that it is similar to the contact members 3 on the track in that it is hinged in the bracket $8^a$ and comprises a middle supporting rib $8^b$. However, it must make electrical connection on both sides and the two sides must be effectually insulated from each other, and the contact plates $8^c$ are mounted on the insulating base $8^d$ which covers the sides of the middle rib $8^b$ and extends down around its lower end $8^{b'}$, as best illustrated in Fig. 4. The plates $8^c$ have transverse ribs $8^{c'}$ formed on them at their lower ends to make scraping contact with the track contact member 7 as they slide over it, and the entire lower end of the member 8 is given a convex or receding formation so that the member 8 may not bind on the member 7 should the vehicle start backward and present the member 8 endwise to the member 7. The member 7 may consist in a segmental wooden block $7'$ of the shape above-described with its upper surface faced with a metal plate $7''$ preferably of brass, the entire member being held down by lag screws $7'''$ driven into the cross ties $4^b$ of the track.

One end of the coil on each electro-magnet $1^e$ is grounded through a conductor 9 and an electro-magnetically controlled switch 10 is provided for each magnet $1^e$, to one pole $10'$ of which the other end of the coil of the respective magnet $1^e$ is connected by means of a conductor $1^{e'}$. The other pole $10''$ of each switch is connected to the lead 6, so that if the two poles $10'$ and $10''$ of the switch 10 are connected by a bar $10^a$ a current will flow from the lead 6 through the coil of the respective magnet $1^e$ energizing it so that it lowers the contact board 1 for which it is provided. To throw the bar $10^a$ into engagement to connect the two poles $10'$ and $10''$ of the switch 10 an electro-magnet $10^b$ is provided on each switch, and the member $10^{a'}$ that supports the bar $10^a$ is provided with an iron pad $10^{a''}$ (Fig. 13) to be attracted by the magnet $10^b$ when it is energized. Another magnet $10^c$ is opposed to the magnet 10ᵇ and acts on a pad 10ᵃ‴ on the support 10ᵃ′ of the switch bar 10ᵃ to withdraw the switch bar 10ᵃ from engagement with the points 10′ and 10″ and interrupt the current to the magnet 1ᵉ supplied therethrough. To guard against accidental engagement of the bar 10ᵃ with the points 10′ and 10″ when the magnet 10ᶜ has withdrawn it from the points a stop pin 10ᵈ may be provided and pivotally mounted on a carrier 10ᵈ′ and provided with a lug 10ᵈ″ engaging with said carrier so that it will not yield to the support 10ᵃ′ of the switch bar 10ᵃ to allow it to recede from the magnet 10ᶜ, but so that it will yield in the other direction to allow the switch bar support to recede from the magnet 10ᵇ under the action of the magnet 10ᶜ. Thus the switch is positively held open and requires that the stop-pin 10ᵈ be withdrawn from engaging position to allow the switch to be closed. To thus withdraw the stop pin 10ᵈ its carrier 10ᵈ′ has an iron pad 10ᵈ‴ which may be attracted by an electro-magnet 10ᵉ when said magnet is energized.

To effect the application of the various contact boards 1 in the order of travel of the car or vehicle along the track in either direction, the switch 10 that controls the operation of the magnet 1ᵉ on each contact board has its electro-magnets 10ᵇ, and 10ᵉ connected to the contact members 8 on the next adjacent contact board 1 in each instance, the terminal contact boards being considered as adjacent in this connection. The coil 10ᶜ of each switch is connected to the contact members 8 on the contact board which it controls. In the diagram in Fig. 1 the contact boards as represented are designated as are the different divisions in the diagram of the track in Fig. 15, as "D¹", "D²", "D³", and "D⁴", while the indicators on the indicating apparatus are designated by the numerals of the stations A′ to A¹⁶.

The two contact members 8 provided on each contact board with their two sides insulated from each other are represented in the diagram by two distinct rectangles for each contact member at the corresponding ends of the contact boards. Thus, as represented, the forward side of the contact member 8 at one end of the board is connected to the rearward side of the contact member 8 at the other end of the board. As indicated in Fig. 3, the contact members on the track are to be considered as on the left hand side of the track looking toward the vehicle as it advances with the contact board "D¹" forward. Thus understood, the connections between the contact members 8 on the contact boards and the coils of the electro-magnets of the switches 10 on the control board may be traced. Taking the contact board "D³" for example a conductor 8ᵉ leads from the forward side of the contact member 8 on the left and from the rearward side of the contact member 8 on the right to the control board and is connected to one end of the coil of the electro-magnet 10ᵉ of the switch that controls the current supplied to the magnet 1ᵉ of the control board "D⁴". The other end of the coil of the magnet 10ᵉ is connected to one end of the coil of the magnet 10ᵇ, and the other end of the coil of the magnet 10ᵇ is connected to the lead 6 that supplies current. The conductor 8ᵉ is also connected to one end of a coil 10ᶜ′ of the magnet 10ᶜ in the switch that controls the current to the magnet 1ᵉ of the control board "D³", and this conductor 8ᵉ also is connected to the corresponding coil 10ᶜ′ in the switch of the control board "D¹". Now if the contact board "D³" be lowered so that the forward side of the contact member 8 on the left engages with a track contact member 7 current will flow through the coils of the electro-magnets 10ᵇ and 10ᵉ thereby closing the switch 10 and allowing current to flow and energize the electro-magnet 1ᵉ that brings the control board "D⁴" down. As the same time the current flowing around the coil 10ᶜ′ of the magnet 10ᶜ in the switch of the control board "D³" on which the contact has taken place will cause this switch to open and interrupt the current to the electro-magnet 1ᵉ of said contact board "D³", whereupon the weight 1ᵈ will raise the contact board "D³" out of operative position. The rear side of the member 8 at the other end of the board "D³" also connected to the conductor 8ᵉ will not come into use except when the vehicle is turned around on the track, as must be provided for.

It will thus be seen that by the change of connections as the vehicle passes from the third division to the fourth as at B in Fig. 15, the contact board for this division is brought into operative position. Now should the vehicle be traveling in the opposite direction and come into the fourth division from the first division, in continuing around the track as at C in Fig. 15, the rear side of the contact member 8 at the left end of the contact board "D¹" would operate by engaging with the track contact member 7 at the end of the fourth division, and for this reason said rear side of the contact member on the contact board "D¹" is connected to the conductor 8ᵉ along with the forward side of the corresponding member 8 on the contact board "D³" and the switches 10 will be operated in a similar manner, in this case raising the contact board "D¹" instead of the contact board "D³". It will be noted that in both instances the magnets 10ᶜ on the switch of the board "D¹" and the switch of the board "D³" were both energized and in each case where the switch was closed it was opened by the magnet and where the switch was already open the action of the magnet was merely to maintain it open.

The arrangement of the connections between the other contact boards and the other switches is identical with the arrangement above described in connection with the contact boards "D¹" and "D³" and their switches, and the contact board "D⁴" and its switch, and the operation in each case is the same. When the vehicle runs in the other direction, the opposite sides of the contact members 8 are brought into engagement and result in closing the switches 10 in opposed order from that above described, and also in opening such switches. Also when thus engaging in the opposite direction the current passes around the other coil $10^{c''}$ of the electro-magnet $10^c$ in each instance. This provision of separate coils for the two circuits for the forward and retrograde movement of the vehicle avoids short circuiting as would occur with a single coil on the magnet at this point.

The shutters $5^a$ on the indicating apparatus or annunciator 5, as will be noted in Fig. 7, are arranged in groups horizontally of the apparatus. A rod $5^c$ extends along under each group and has pins $5^{c'}$ that extend up to form stops for the shutters $5^a$ when they come open. These rods $5^c$ are normally held back by springs $5^{c''}$ but may be drawn forward by electro-magnets $5^d$ and close any shutter that may be open in the group. The electro-magnets $5^d$ of all the groups have current supplied to them from the main 6 through a conductor $5^{d'}$, as will be seen in the diagrams in Figs. 1 and 17, and the coils of two of them, viz:—the one of the first group and the one of the third group, have their other ends connected to a conductor $5^{d''}$, while those of the second and fourth groups are connected to a conductor $5^{d'''}$. A series of points $5^e$ is provided to each group of shutters, one of said points being adjacent to each shutter, and the shutters having flexible tongues $5^{e'}$ to momentarily contact with the points $5^e$ as the shutters come open. This is best illustrated in Fig. 8 of the drawings. All of the points of the second and fourth groups are connected by means of conductors $5^{e''}$ to the conductor $5^{d''}$, and all of those of the first and third groups are connected by a conductor $5^{e'''}$ to the conductor $5^{d'''}$. The tongues $5^{e'}$ on the shutters are in electrical connection with the shutters and grounded therethrough and through the case of the annunciator, which may be of metal. In the diagrams in Figs. 1 and 17 these grounded connections are represented by conductors leading to the conductor 9. Thus arranged, when any shutter opens in one group it will act to close any one or all shutters open in the next adjacent group, the first and fourth groups being considered as adjacent groups also. Thus by alternating the successive station designations from one group to an adjacent group closing of the last opened shutter by the opening of the next shutter will be effected throughout the series. The inside of the tongue $5^{e'}$ has an insulating covering $5^{e''}$ that prevents connection on contact with the point $5^e$ when the door closes. Preferably, the rods $5^c$ are positioned some distance from the front of the casing, and each shutter $5^a$ has a segmental lug $5^{a''}$ for engagement with the corresponding pin $5^{c'}$ on the rod $5^c$.

With the use of the above-described apparatus the installation of a signal system for indicating stations or transmitting other predetermined signals on a railroad is simplified by the avoidance of any material change in the track or rolling stock, and the application of the system to an indefinite number of stations is made possible by the provision of the successive groups of operative elements and the mechanism for effecting the changes from one group to the next as the vehicle runs in either direction on the road.

While I have herein shown and described specifically certain precise details of construction it will be understood that various modifications may be made in the minor details of my invention without departure from the scope and spirit thereof, and therefore I do not wish to be understood as limiting myself to the precise specifications and illustrations contained herein, but

What I claim as new and desire to secure by Letters Patent is:—

1. In railway signal apparatus, in combination with a track and a vehicle running thereon, a plurality of indicators on the vehicle, means along the track defining signaling intervals therealong, said signaling intervals being arranged in distinct series, each means defining a signaling interval being adapted to coöperate with a respective indicator, by which relation corresponding series of said indicators are defined, operating means for successively bringing the thus defined series of indicators into condition for successive coöperation of respective ones of the interval-defining means with the corresponding indicators of the corresponding series, and controlling means causing said operating means to bring said series of indicators into said condition in the order of succession of the separate series of signaling intervals during travel of the vehicle along said track.

2. In railway signal apparatus, in combination with a track and a vehicle running thereon, a plurality of indicators on the vehicle, means along the track defining signaling intervals therealong, said signaling intervals being arranged in distinct series, each means defining a signaling interval being adapted to coöperate with a respective indicator, by which relation corresponding series of said indicators are defined, operating means for successively bringing the thus defined series of indicators into condition for successive coöperation of respective ones of the interval-defining means with the corresponding indicators of the corresponding series, controlling means causing said operating means to bring said series of indicators into said condition in the order of succession of the separate series of signaling intervals during travel of the vehicle along said track, and means for maintaining said order of succession during travel of the vehicle along said track in either direction.

3. In railway signal apparatus, in combination with a track and a vehicle running thereon, a plurality of indicators on the vehicle, means along the track defining signaling intervals therealong, said signaling intervals being arranged in distinct series, each means defining a signaling interval being adapted to coöperate with a respective indicator, by which relation corresponding series of said indicators are defined, operating means for successively bringing the thus defined series of indicators into condition for successive coöperation of respective ones of the interval-defining means with the corresponding indicators of the corresponding series, controlling means causing said operating means to bring said series of indicators into said condition in the order of succession of the separate series of signaling intervals during travel of the vehicle along said track, and means for maintaining said order of succession with the vehicle turned in either direction on said track.

4. In railway signal apparatus, in combination with a track and a vehicle running thereon, a plurality of indicators on the vehicle, means along the track defining signaling intervals therealong, said signaling intervals being arranged in distinct series, each means defining a signaling interval being adapted to coöperate with a respective indicator, by which relation corresponding series of said indicators are defined, operating means for successively bringing the thus defined series of indicators into condition for successive coöperation of respective ones of the interval-defining means with the corresponding indicators of the corresponding series, controlling means causing said operating means to bring said series of indicators into said condition in the order of succession of the separate series of signaling intervals during travel of the vehicle along said track, means for maintaining said order of succession during travel of the vehicle along said track in either direction, and means for maintaining said order of succession with the vehicle turned in either direction on said track.

5. In railway signal apparatus, in combination with a track and a vehicle running thereon, a plurality of indicators on the vehicle, means along the track defining signaling intervals therealong, electrical circuit-completing means defining distinct series of said signaling intervals, each means defining a signaling interval being adapted to coöperate with a respective indicator, by which relation corresponding series of said indicators are defined, electro-magnetic operating means carried entirely on the vehicle, for successively bringing the thus defined series of indicators into condition for successive coöperation of respective ones of the interval-defining means with the corresponding indicators of the corresponding series, electro-magnetic controlling means carried entirely on the vehicle, circuits through which said controlling means is energized when said circuits are completed by said circuit-completing means, causing said electro-magnetic operating means to bring said series of indicators into said condition in the order of succession of the separate series of signaling intervals during travel of the vehicle along said track, and means carried entirely on the vehicle for supplying current to said circuits.

6. In railway signal apparatus, in combination with a track and a vehicle running thereon, a plurality of indicators on the vehicle, means along the track defining signaling intervals therealong, means defining distinct series of said intervals, each means defining an interval being adapted to coöperate with a respective indicator, by which relation corresponding series of said indicators are defined, operating means coöperating with the means that defines the series of signaling intervals, for successively bringing the thus defined series of indicators into condition for successive coöperation of the corresponding ones of the interval-defining means with respective indicators of the corresponding series, and controlling means causing said operating means to bring said series of indicators into said condition in the order of succession of the separate series of signaling intervals during travel of the vehicle along said track.

7. In railway signal apparatus, in combination with a track and a vehicle running thereon, a plurality of indicators on the vehicle, means along the track defining signaling intervals therealong, means defining distinct series of said intervals, each means defining an interval being adapted to coöperate with a respective indicator, by which relation corresponding series of said indicators are defined, operating means, coöperating with the means that define the series of signaling intervals, for successively bringing the thus defined series of indicators into condition for successive coöperation of respective ones of the interval-defining means with the corresponding indicators of the corresponding series, controlling means, causing said operating means to bring said series of indicators into said condition in the order of succession of the separate series of signaling intervals during travel of the vehicle along said track, and means for maintaining said order of succession during travel of the vehicle along said track in either direction.

8. In railway signal apparatus, in combination with a track and a vehicle running thereon, a plurality of indicators on the vehicle, means along the track defining signaling intervals therealong, means defining distinct series of said intervals, each means defining an interval being adapted to coöperate with a respective indicator, by which relation corresponding series of said indicators are defined, operating means, coöperating with the means that define the separate series of signaling intervals, for successively bringing the thus defined series of indicators into condition for successive coöperation of respective ones of the interval-defining means with the corresponding indicators of the corresponding series, controlling means, causing said operating means to bring said series of indicators into said condition in the order of succession of the separate series of signaling intervals during travel of the vehicle along said track, and means for maintaining said order of succession with the vehicle turned in either direction on said track.

9. In railway signal apparatus, in combination with a track and a vehicle running thereon, a plurality of indicators on the vehicle, means along the track defining signaling intervals therealong, means defining distinct series of said intervals, each means defining an interval being adapted to coöperate with a respective indicator, by which relation corresponding series of said indicators are defined, operating means, coöperating with the means that define the series of signaling intervals, for successively bringing the thus defined series of indicators into condition for successive coöperation of respective ones of the interval-defining means with the corresponding indicators of the corresponding series, controlling means, causing said operating means to bring said series of indicators into said condition in the order of succession of the separate series of signaling intervals during travel of the vehicle along said track, means for maintaining said order of succession during travel of the vehicle along said track in either direction, and means for maintaining said order of succession with the vehicle turned in either direction on said track.

10. In railway signal apparatus, in combination with a track and a vehicle running thereon, a plurality of indicators on the vehicle, longitudinally succeeding series of engaging-means along the track, each engaging-means of a series being alined with a respective engaging-means of each other series, and being adapted to coöperate with a respective indicator, by which relation corresponding series of said indicators are defined, operating means for successively bringing the thus defined series of indicators into condition for coöperation of respective ones of the track engaging-means with the corresponding indicators of the corresponding series, and controlling means for causing said operating means to bring said separate series of indicators into said condition in the order of succession of the separate series of track engaging-means during travel of the vehicle along said track.

11. In railway signal apparatus, in combination with a track and a vehicle running thereon, a plurality of indicators on the vehicle, longitudinally succeeding series of engaging-means along the track, each engaging-means of a series being alined with a respective engaging-means of each other series, and being adapted to coöperate with a respective indicator, by which relation corresponding series of said indicators are defined, operating means for successively bringing the thus defined series of indicators into condition for coöperation of respective ones of the track-engaging means with the corresponding indicators of the corresponding series, controlling means for causing said operating means to bring said separate series of indicators into said condition in the order of succession of the separate series of track engaging-means during travel of the vehicle along said track, and means for maintaining said order of succession during travel of the vehicle along said track in either direction.

12. In railway signal apparatus, in combination with a track and a vehicle running thereon, a plurality of indicators on the vehicle, longitudinally succeeding series of engaging-means along the track, each engaging-means of a series being alined with a respective engaging-means of each other series, and being adapted to coöperate with a respective indicator, by which relation corresponding series of said indicators are defined, operating means for successively bringing the thus defined series of indicators into condition for coöperation of respective ones of the track engaging-means with the corresponding indicators of the corresponding series, controlling means for causing said operating means to bring said separate series of indicators into said condition in the order of succession of the separate series of track engaging-means during travel of the vehicle along said track, and means for maintaining said order of succession with the vehicle reversed on the track.

13. In railway signal apparatus, in combination with a track and a vehicle running thereon, a plurality of indicators on the vehicle, longitudinally succeeding series of engaging-means along the track, each engaging-means of a series being alined with a respective engaging-means of each other series, and being adapted to coöperate with a respective indicator, by which relation corresponding series of said indicators are defined, operating means for successively bringing the thus defined series of indicators into condition for coöperation of respective ones of the track engaging-means with the corresponding indicators of the corresponding series, controlling means for causing said operating means to bring said separate series of indicators into said condition in the order of succession of the separate series of track engaging-means during travel of the vehicle along said track, means for maintaining said order of succession during travel of the vehicle along said track in either direction, and means for maintaining said order of succession with the vehicle turned in either direction on said track.

14. In railway signal apparatus, in combination with a track and a vehicle running thereon, a plurality of electro-magnetic indicators on the vehicle and a plurality of incomplete circuits in which respective ones of said indicators are included, longitudinally succeeding series of circuit-completing means along the track, each means of a series being alined with a respective means of each other series, and being adapted to complete the electrical circuit through a respective indicator, by which relation corresponding series of said indicators are defined, electro-magnetic operating means for successively bringing the thus defined series of indicators into condition for completion by respective ones of the circuit-completing means of the circuits through the corresponding indicators of the corresponding series, and electro-magnetic controlling means for causing said electro-magnetic operating means to bring said series of indicators into said condition in the order of succession of the series of track engaging-means during travel of the vehicle along said track, and means for supplying current to said circuits and said electro-magnetic means.

15. In railway signal apparatus, in combination with a track and a vehicle running thereon, a plurality of indicators on the vehicle, engaging-means arranged in distinct series on the vehicle, connection from each indicator to a respective engaging-means, by which relation corresponding series of said indicators are defined, each series of engaging-means being arranged transversely of the direction of travel of the vehicle but the several series succeeding each other in said direction, series of engaging-means along the track, each series being arranged transversely of the track to correspond in arrangement to the transverse arrangement of the vehicle engaging-means, and said series succeeding longitudinally of the track, operating means for successively bringing the several series of vehicle engaging-means into condition for coöperation of respective ones of the track engaging-means with the corresponding ones of a series of indicators through respective vehicle engaging-means, and controlling means causing said operating means to bring said series of vehicle engaging-means into said condition in the order of succession of the several series of track engaging-means during travel of the vehicle along the track.

16. In railway signal apparatus, in combination with a track and a vehicle running thereon, a plurality of indicators on the vehicle, engaging-means arranged in distinct series on the vehicle, connection from each indicator to a respective engaging-means, by which relation corresponding series of said indicators are defined, each series of engaging-means being arranged transversely of the direction of travel of the vehicle but the several series succeeding each other in said direction, series of engaging-means along the track, each series being arranged transversely of the track to correspond in arrangement to the transverse arrangement of the vehicle engaging-means, and said series succeeding longitudinally of the track, operating means for successively bringing the several series of vehicle engaging-means into condition for coöperation of respective ones of the track engaging-means with the corresponding ones of a series of indicators through respective vehicle engaging-means, controlling means causing said operating means to bring said series of vehicle engaging-means into said condition in the order of succession of the several series of track engaging-means during travel of the vehicle along the track, and means for maintaining said order of succession during travel of the vehicle along said track in either direction.

17. In railway signal apparatus, in combination with a track and a vehicle running thereon, a plurality of indicators on the vehicle, engaging-means arranged in distinct series on the vehicle, connection from each indicator to a respective engaging-means, by which relation corresponding series of said indicators are defined, each series of engaging-means being arranged transversely of the direction of travel of the vehicle but the several series succeeding each other in said direction, series of engaging-means along the track, each series being arranged transversely of the track to correspond in arrangement to the transverse arrangement of the vehicle engaging-means, and said series succeeding longitudinally of the track, operating means for successively bringing the several series of vehicle engaging-means into condition for coöperation of respective ones of the track engaging-means with the corresponding ones of a series of indicators through respective vehicle engaging-means, controlling means causing said operating means to bring said series of vehicle engaging-means into said condition in the order of succession of the several series of track engaging-means during travel of the vehicle along the track, and means for maintaining said order of succession with the vehicle turned in either direction on said track.

18. In railway signal apparatus, in combination with a track and a vehicle running thereon, a plurality of indicators on the vehicle, engaging-means arranged in distinct series on the vehicle, connection from each indicator to a respective engaging-means, by which relation corresponding series of said indicators are defined, each series of engaging-means being arranged transversely of the direction of travel of the vehicle but the several series succeeding each other in said direction, series of engaging-means along the track, each series being arranged transversely of the track to correspond in arrangement to the transverse arrangement of the vehicle engaging-means, and said series succeeding longitudinally of the track, operating means for successively bringing the several series of vehicle engaging-means into condition for coöperation of respective ones of the track engaging-means with the corresponding ones of a series of indicators through respective vehicle engaging-means, controlling means causing said operating means to bring said series of vehicle engaging-means into said condition in the order of succession of the several series of track engaging-means during travel of the vehicle along the track, means for maintaining said order of succession during travel of the vehicle along said track in either direction, and means for maintaining said order of succession with the vehicle turned in either direction on said track.

19. In railway signal apparatus, in combination with a track and a vehicle running on the track, a plurality of electromagnetic indicators on the vehicle, contacts on the vehicle, contacts along the track, electrical connection from each indicator to a respective one of said contacts on the vehicle, controlling contacts on the vehicle, controlling contacts along said track, defining successive series of the aforesaid contacts along the track, and adapted to electrically connect with said controlling contacts on said vehicle, each of the first mentioned contacts along the track being adapted to electrically connect with a respective contact on the vehicle, and being thus adapted to coöperate with a respective indicator, by which relation series of said indicators corresponding to the series of vehicle contacts are defined, a plurality of electro-magnetic means, each energized through connection of one of said controlling contacts on the vehicle with a controlling contact along the track, said electro-magnetic means operating to successively bring the several series of indicators into condition for completion of circuits through the respective indicators by connection of the vehicle contacts connected to said indicators with the corresponding ones of the corresponding series of contacts along the track, means for controlling the operation of the electro-magnetic means, whereby said indicators are brought into said condition in the order of the succession of the separate series of contacts along the track, means completing circuits through said contacts, said indicators and said electro-magnetic means, and means for supplying current to said circuits.

20. In railway signal apparatus, in combination with a vehicle and a track having two rails on which the vehicle is adapted to run, a plurality of indicators on the vehicle, distinct series of engaging means on the track, each one of a series adapted to coöperate with a respective indicator on the vehicle when passed by the vehicle, said engaging-means being located variously transversely of the track between its rails, but the number of various transverse locations of said engaging means being less than the number of said engaging-means and of their respective indicators on the vehicle, whereby the engaging-means constitute a plurality of series, with one in each series alined with one of each other series in their aforesaid transverse locations, the indicators with which the respective track engaging-means are adapted to coöperate as aforesaid, being, by such relation, divided into series corresponding to the series of track engaging-means, means to bring said series of indicators into condition for coöperation of respective track engaging-means with the corresponding indicators of corresponding series, and controlling means causing the series of indicators to be brought into the aforesaid condition in the order of succession of the separate series of track engaging-means during travel of the vehicle along said track.

21. In railway signal apparatus, in combination with a vehicle and a track having two rails on which the vehicle is adapted to run, and a plurality of stations along the track, a plurality of indicators on the vehicle, each adapted to designate a respective one of said stations, a plurality of engaging-means on the track, each passed by the vehicle on its approach to a respective one of said stations, said engaging-means being located variously transversely of the track between its rails, but the number of various transverse locations of said engaging-means being less than the number of said stations and of their corresponding indicators on the vehicle, whereby the engaging-means constitute a plurality of series, with one in each series alined with one of each other series controlling engaging-means on the track, so located along the track as to intervene between the aforesaid series of track engaging-means, the indicators designating the respective stations with which the respective track engaging-means are associated, being, by such relation, divided into series corresponding to the series of track engaging-means, controlling engaging-means on the vehicle, adapted to engage with the controlling track engaging-means, means for successively bringing said series of indicators into condition for coöperation of respective track engaging-means with the corresponding indicators of the corresponding series, the arrangement of the various engaging-means being such that each indicator designating a station will, when brought into the aforesaid condition, be operated by the engagement of the respective vehicle engaging-means with the track engaging-means which the vehicle passes in approaching the respective station, and controlling means operated through engagement of said controlling vehicle engaging-means and controlling track engaging-means, causing the series of indicators to be brought into the aforesaid condition in the order of succession of the several series of stations during travel of the vehicle along said track.

22. In railway signal apparatus, in combination with a vehicle and a track having two rails on which the vehicle runs, a contact board mounted on the vehicle transversely thereof, and having an end part extending out past the rail at one side of the vehicle, indicator-controlling contact members mounted on the contact board, some facing in one direction and others facing in the other direction along the track, and arranged at intervals of the length of the contact board between the rails, contact-controlling contact members, some facing in one direction and others facing in the other direction along the track, on said end part, contact members on the track, between the rails, adapted to coöperate with respective ones of the indicator-controlling contact members facing in one direction or the other when the vehicle travels along the track in one direction or the other, and a contact member on the track outside the rail, adapted to coöperate with the contact-controlling contact members facing in one direction or the other on the contact board when the vehicle travels along the track in one direction or the other.

23. In railway signal apparatus, in combination with a vehicle and a track having two rails on which the vehicle runs, a contact board mounted on the vehicle transversely thereof, and having end parts extending out past the rails at both sides of the vehicle, indicator-controlling contact members mounted on the contact board at intervals of its length between the rails, contact-controlling contact members mounted on said end parts, contact members mounted on the track, between the rails, to coöperate with the indicator-controlling contact members on the contact board, and a contact member on the track, outside the rail at one side, adapted to coöperate with the contact-controlling contact member on either of said end parts, accordingly as the vehicle is turned in one direction or the other on the track.

24. In railway signal apparatus, in combination with a vehicle and a track having two rails on which the vehicle runs, a contact board mounted on the vehicle transversely thereof, and having end parts extending out past the rail at both sides of the vehicle, indicator-controlling contact members mounted on the contact board, some facing in one direction and others facing in the other direction along the track, and arranged at intervals of the length of the contact board between the rails, contact-controlling contact members, some facing in one direction and others facing in the other direction along the track, on said end parts, contact members on the track, between the rails adapted to coöperate with respective ones of the indicator-controlling contact members facing in one direction or the other on the contact board when the vehicle travels along the track in one direction or the other, and a contact member on the track, outside the rail at one side, adapted to coöperate with the contact-controlling contact member on either of said end parts, accordingly as the vehicle is turned one way or the other on the track.

25. In railway signal apparatus, in combination with a vehicle, a plurality of indicators on the vehicle, distinct series of indicator-controlling means on the vehicle, operative connection from each indicator-controlling means to a respective indicator, said series of indicator-controlling means being brought into or out of condition for operation by being shifted, a plurality of shifting means, each shifting one of said series, controlling means for each one of said shifting means, and means for operating each one of said controlling means in turn to cause said shifting means to shift said series successively, comprising a plurality of controlling engaging-means, and operative connection between respective controlling engaging-means and controlling means, and between respective controlling means and shifting means, whereby said shifting means and said controlling means are operated during the travel of the vehicle.

26. In railway signal apparatus, in combination with a vehicle, a plurality of indicators on the vehicle, distinct series of indicator-controlling means on the vehicle, operative connection from each indicator-controlling means to a respective indicator, said series of indicator-controlling means being brought into or out of condition for operation by being shifted, a plurality of shifting means, each shifting one of said series, controlling means for each one of said shifting means, and means for operating each one of said controlling means in turn to cause said shifting means to shift said series successively, comprising a plurality of controlling engaging-means, operative connection between respective controlling engaging-means and controlling means, and between respective controlling means and shifting means, whereby said shifting means and said controlling means are operated during travel of the vehicle, said engaging-means being engageable in both directions of travel of the vehicle, and the operative connections between these means and the controlling means being so arranged that the order of succession of shifting of the series of indicator-controlling means is maintained during travel of the vehicle in either direction.

27. In railway signal apparatus, in combination with a vehicle, a plurality of indicators on the vehicle, distinct series of indicator-controlling means on the vehicle, operative connection from each indicator-controlling means to a respective indicator, said series of indicator-controlling means being brought into or out of condition for operation by being shifted, a plurality of shifting means, each shifting one of said series, controlling means for each one of said shifting means, and means for operating each one of said controlling means in turn to cause said shifting means to shift said series successively, comprising a plurality of controlling engaging-means, operative connection between respective controlling engaging-means and controlling means, and between respective controlling means and shifting means, whereby said shifting means and said controlling means are operated during the travel of the vehicle, duplicate engaging-means located on the vehicle in opposite relation from the aforesaid controlling engaging-means, and operative connection between respective duplicate engaging-means and shifting and controlling means, whereby said shifting means and said controlling means are operated during travel of the vehicle when it is reversed, and whereby the order of succession of shifting of said series of indicator-controlling means is maintained during travel of the vehicle while thus reversed.

28. In railway signal apparatus, in combination with a vehicle, a plurality of indicators on the vehicle, distinct series of indicator controlling means on the vehicle, operative connection from each indicator-controlling means to a respective indicator, said series of indicator-controlling means being brought into or out of condition for operation by being shifted, a plurality of shifting means, each shifting one of said series, controlling means for each one of said shifting means, and means for operating each one of said controlling means in turn to cause said shifting means to shift said series successively, comprising a plurality of controlling engaging-means, operative connection between respective controlling engaging-means and controlling means, and between respective controlling means and shifting means, whereby said shifting means and said controlling means are operated during the travel of the vehicle, said engaging-means being engageable in both directions of travel of the vehicle, and the operative connections between these means and the controlling means being so arranged that the order of succession of shifting of the series of indicator-controlling means is maintained during travel of the vehicle in either direction, duplicate engaging-means located on the vehicle in opposite relation from the aforesaid controlling engaging-means, and being engageable in both directions of travel of the vehicle, and connections between respective duplicate engaging-means and shifting and controlling means, whereby said shifting means and controlling means are operated during travel of the vehicle when it is reversed, and whereby the order of succession of shifting of said contact boards is maintained during travel of the vehicle while thus reversed, and during travel of the vehicle in either direction.

29. In railway signal apparatus, in combination with a track and a vehicle running on the track, a plurality of electro-magnetically operated indicators on the vehicle, distinct series of contacts on the vehicle, contacts along the track, electrical connection from each indicator to a respective one of said vehicle contacts, by which relation series of said indicators corresponding to the series of vehicle contacts are defined, each series of vehicle contacts being adapted to be brought into and out of condition for electrical connection of its contacts with respective contacts along the track, and means for bringing said series into said condition successively in the order of travel of the vehicle along the track in either direction, comprising controlling contacts along the track, and controlling contacts associated with each series of contacts on the vehicle and adapted to be brought into or out of condition for connection with their respective track contacts, said controlling track contacts defining successive series of the aforementioned contacts along said track, each such series corresponding in number and arrangement to a respective series of said vehicle contacts and indicators, electro-magnetic operating-means for bringing each series of vehicle contacts into and out of condition for connection with their track contacts, connection from each of said electro-magnetic operating-means to the controlling contacts associated with each of the next series of vehicle contacts in either direction in the aforesaid order, each such controlling contact, when electrically connected with one of the controlling track contacts, causing the respective electro-magnetic means to bring its series of vehicle contacts into condition for the aforesaid connection of its respective contacts with the corresponding ones of the corresponding series of track contacts, whereby each vehicle contact is caused to operate a respective indicator in a corresponding series of indicators, means completing circuits through said contacts, said indicators and said electro-magnetic means, and means for supplying current to said circuits.

30. In railway signal apparatus, in combination with a track and a vehicle running on the track, a plurality of electro-magnetically operated indicators on the vehicle, distinct series of contacts on the vehicle, contacts along the track, electrical connection from each indicator to a respective one of said vehicle contacts, by which relation series of said indicators corresponding to the series of vehicle contacts are defined, each series of vehicle contacts being adapted to be brought into and out of condition for electrical connection of its contacts with respective contacts along the track, and means for bringing said series into said condition successively in the order of travel of the vehicle along the track in either direction, comprising controlling contacts along the track, and controlling contacts associated with each series of contacts on the vehicle and adapted to be brought into or out of condition for electrical connection with the controlling track contacts when the associated series of vehicle contacts are brought into and out of condition for connection with their respective track contacts, said controlling track contacts defining successive series of the aforementioned contacts along said track, each such series corresponding in number and arrangement to a respective series of said vehicle contacts and indicators, electro-magnetic operating-means for bringing each series of vehicle contacts into and out of condition for connection with their track contacts, connection from each of said electro-magnetic operating-means to the controlling contacts associated with each of the next series of vehicle contacts in either direction in the aforesaid order, each such controlling contact, when electrically connected with one of the controlling track contacts, causing the respective electro-magnetic operating means to bring its series of vehicle contacts into condition for the aforesaid connection of its respective contacts with corresponding ones of the corresponding series of track contacts, whereby each vehicle contact is caused to operate a respective indicator in a corresponding series of indicators, duplicate series of vehicle contacts connected with respective ones of the aforesaid vehicle contacts and their corresponding indicators, and duplicate controlling contacts connected with respective ones of the aforesaid controlling contacts on the vehicle and with their corresponding electro-magnetic operating-means, but the vehicle contacts of said duplicate series, and said duplicate controlling contacts, being located to make connection with corresponding track contacts when the vehicle is reversed on the track, to maintain said order of succession when the vehicle is thus reversed, means completing circuits through said contacts, said indicators and said electro-magnetic means, and means for supplying current to said circuits.

31. In railway signal apparatus, in combination with a vehicle, a plurality of indicators on the vehicle, distinct series of indicator-controlling means on the vehicle, operative connection from each indicator-controlling means to a respective indicator, said series of indicator-controlling means being brought into or out of condition for operation by being shifted into or out of a position, and means for shifting said series successively in the order of travel of the vehicle in either direction, comprising a plurality of shifting means, each operating to shift one of the series into said position when force is exerted upon it, and releasing the series from said position when the exertion of force ceases, engaging-means shifted with each series, controlling means, each allowing the exertion of force on one of said shifting means when actuated in one direction and stopping said application of force when actuated in another direction, actuating means for each of the controlling means, actuating it in direction to stop said application of force, connection from each of these actuating means to the engaging-means shifted with the series under the control of the controlling means that this actuating means actuates, a second actuating means for each controlling means, actuating the controlling means to apply energy to its respective shifting means, and connection from each of these second actuating means to the engaging means which are to be shifted with the series next to said series in either direction in the aforesaid order.

32. In railway signal apparatus, in combination with a vehicle and a track on which the vehicle runs, a plurality of longitudinally succeeding transverse series of indicator-controlling means on the vehicle, each series being arranged transversely of the vehicle, each of said means being adapted to operatively engage in either direction longitudinally of the vehicle and of the track, a plurality of separate longitudinally succeeding series of engaging-means along the track, each engaging-means of each of these series having a location, longitudinally of the track and transversely of the track different from that of each other engaging means of the series, and being adapted to engage in either direction to coöperate with the respective indicator-controlling means of the series on the vehicle engaging in either direction, each of said series of indicator-controlling means being shiftable into position for its engaging means to coöperate with the track engaging-means as aforesaid, or out of position therefor, and means for shifting said series into or out of said position successively in the order of travel of the vehicle along the track in either direction, comprising controlling engaging-means shiftable with each series of indicator-controlling means on the vehicle, each adapted to engage in either direction longitudinally of the vehicle, and controlling engaging-means on the track, each intermediate of and defining adjacent ones of said series of selective indicator-controlling track engaging-means and adapted to coöperate with said controlling engaging-means engaging in either direction on the vehicle, a plurality of shifting means, each shifting one of said series into position for coöperation of its indicator-controlling means with the engaging means on the track, means opposed to said shifting means to shift said series out of their positions for such coöperation when action of the shifting means thereon ceases, controlling means actuated in one direction to cause said shifting means to act, and actuated in an opposite direction to cause cessation of such action, a plurality of actuating means, each actuating one of said controlling means in the first direction, operative connection from each of these actuating means to the engaging-means engaging in direction away from the respective series, and which are shiftable with the series which are to be shifted next to the respective contact board in either direction in the aforesaid order, a plurality of other actuating means, each actuating one of said controlling means in the other direction, and operative connection from each of these actuating means to engaging-means engaging in both directions, and which are shiftable with the series shifted under the control of the controlling means which the respective actuating means actuates.

33. In railway signal apparatus, a plurality of contact boards on a vehicle, each adapted to carry indicator-controlling means and bring said indicator-controlling means into or out of condition for operation by being shifted, and means for shifting said contact boards individually in order of travel of the vehicle.

34. In railway signal apparatus, a plurality of contact boards on a vehicle, each adapted to carry indicator-controlling means and bring said indicator-controlling means into or out of condition for operation by being shifted, means for shifting said contact boards individually in order of travel of the vehicle, means whereby each contact board controls its own shifting means, and means whereby each contact board controls the shifting means of contact boards next to it in either direction in the aforesaid order.

35. In railway signal apparatus, a plurality of contact boards on a vehicle, each adapted to carry indicator-controlling means and bring said indicator-controlling means into or out of condition for operation by being shifted, means for shifting said contact boards individually in order of travel of the vehicle, and means for controlling the operation of said shifting means to maintain said order of shifting during travel of the vehicle in either direction.

36. In railway signal apparatus, a plurality of contact boards on a vehicle, each adapted to carry indicator-controlling means and bring said indicator-controlling means into or out of condition for operation by being shifted, means for shifting said contact boards individually in order of travel of the vehicle, and means for controlling the operation of said shifting means when the vehicle is reversed, whereby said order of shifting is maintained during travel of the vehicle while thus reversed.

37. In railway signal apparatus, a plurality of contact boards on a vehicle, each adapted to carry indicator-controlling means and bring said indicator-controlling means into or out of condition for operation by being shifted, means for shifting said contact boards individually in order of travel of the vehicle, means for controlling the operation of said shifting means to maintain said order during travel of the vehicle in either direction, and means whereby said order of shifting is maintained during travel of the vehicle when reversed.

38. In railway signal apparatus, a plurality of series of indicator-controlling means on a vehicle, a case in which said series of indicator-controlling means are contained, and from which said indicator-controlling means may project downwardly for operation, levers fulcrumed in the case, each supporting one of said series, a plurality of actuating means in the case, each actuating one of said levers to project one of said series of indicator-controlling means downwardly from the case, and means for counteracting the action of each of said actuating means, to maintain the respective series of indicator-controlling means against projection from the case, and thus hold the respective indicator-controlling means out of position for operation, except during the action of said actuating means on the levers.

39. In railway signal apparatus, in combination with a track and a vehicle adapted to run on the track, a series of contacts arranged transversely of the vehicle, some of which are arranged to make electrical contact in one direction and the others of which are arranged to make electrical contact in the other direction along the track, and a series of contacts on the track, arranged transversely of the track and corresponding in number and transverse arrangement to the contacts arranged to connect in either direction on the vehicle, and means for preventing electrical contact of each track contact with a respective vehicle contact while the vehicle travels in one direction on the track, but permitting said contact when the vehicle travels in the other direction along the track.

40. In railway signal apparatus, in combination with a track and a vehicle running on the track, a contact board, contacts on the contact board arranged in a series transversely of the vehicle and being arranged at opposite sides of said contact board, with electrical connecting surfaces faced outwardly thereof in opposite directions along the track, and insulated from each other, but with electrically conducting inner adjacent sides, contacts on the track arranged transversely of the track and corresponding in number and transverse arrangement with the series of contact board contacts, but said track contacts succeeding longitudinally of the track, each track contact having an electrical connecting surface faced in one direction, but having an insulating surface faced in the other direction, said surfaces being adapted to engage with respective outwardly faced surfaces of contacts on the contact board, and means preventing electrical connection between electrical connecting faces of the track contacts and said conducting inner surfaces of the contacts on the contact board.

JOSEPH H. ALANDAR.

Witnesses:
CLARENCE PERDEW,
JOSEPH T. HARRISON.

Copies of this patent may be obtained for five cents each, by addressing the "Commissioner of Patents, Washington, D. C."